United States Patent [19]
Kautz

[11] Patent Number: 5,715,976
[45] Date of Patent: Feb. 10, 1998

[54] CARTRIDGE BEARING ASSEMBLY FOR VOLUMETRIC FEEDER

[75] Inventor: Timothy J. Kautz, Osceola, Wis.

[73] Assignee: Tecnetics Industries Inc., St. Paul, Mich.

[21] Appl. No.: 504,857

[22] Filed: Jul. 20, 1995

[51] Int. Cl.⁶ .................................................. G01F 11/20
[52] U.S. Cl. .......................... 222/413; 198/672; 384/537
[58] Field of Search .............................. 222/185.1, 412, 222/413; 198/672, 674, 657; 384/537, 541, 546

[56] References Cited

U.S. PATENT DOCUMENTS

| | | |
|---|---|---|
| 2,686,698 | 8/1954 | Moore, Jr. ........................ 384/537 X |
| 3,770,109 | 11/1973 | Kraft . |
| 5,110,015 | 5/1992 | Kilts ........................................ 222/413 |
| 5,183,147 | 2/1993 | Callahan et al. . |
| 5,263,572 | 11/1993 | Hove . |
| 5,297,875 | 3/1994 | Gattrugeri ............................ 384/537 X |

OTHER PUBLICATIONS

Brochure entitled, "Tecweigh Volumetric Feeders: the Inside Story," 1993.

*Primary Examiner*—Gregory L. Huson
*Attorney, Agent, or Firm*—Merchant, Gould, Smith, Edell, Welter & Schmidt

[57] ABSTRACT

An improved cartridge bearing assembly for a dry good material feeder. The feeder includes a feed hopper having a drive opening spaced from a housing wall having an opening. A tubular bearing support member extends into the drive opening and is attached to the wall in line with the wall opening. A bearing support assembly is removably mounted in the bearing support member for rotatably supporting a drive shaft. The bearing support assembly can be removed through the wall opening for bearing replacement.

11 Claims, 2 Drawing Sheets

CARTRIDGE BEARING ASSEMBLY FOR VOLUMETRIC FEEDER

BACKGROUND OF THE INVENTION

1. Field of the Invention

This invention relates to dry good material feeding devices which are used for dispensing or conveying powders and bulk dry materials such as chemicals. More particularly, this invention relates to a new cartridge bearing assembly for supporting an auger drive shaft such that it can be more quickly and easily replaced.

2. Description of the Prior Art

Dry good material feeders of the type which are manufactured at Tecnetics, Inc. of St. Paul, Minn., which is the assignee of this application, commonly include a hopper having an inclined storage area and a lower cylindrical portion for housing a rotating auger. The rotating auger conveys dry material such as a powdered chemical from the inclined holding area through a cylindrical passage to a space outside of the hopper. In order to provide the mechanical energy which is necessary to turn the auger, a drive arrangement is utilized which extends from the opposite end of the auger from the direction in which the dry material is discharged.

This arrangement is depicted in U.S. Pat. No. 5,110,015 dated May 5, 1992, entitled SEALING ARRANGEMENT FOR DRY GOOD FEEDER, which is assigned to applicant herein. In that arrangement, the drive shaft is supported by spaced ball bearings mounted in a tubular member which extends into an opening in the hopper and is attached at its other end to a wall of the housing. To replace the bearings in that assembly, it was necessary to remove the hopper and auger, remove the drive shaft sprocket and then remove the tubular member carrying the bearings and drive shaft. At that point, the bearings could be replaced and the entire unit reassembled.

In actual practice, it was found that the feeder would operate not longer than approximately 200–220 hours without bearing failure. When the bearings did fail, between three and five hours of difficult work was required to replace the bearings. In addition to the substantial amount of maintenance time required, replacing the bearings resulted in equally long periods of lost production.

SUMMARY OF THE INVENTION

The present invention replaces the tubular bearing support member of the prior arrangement with a new cartridge bearing assembly design which fits into the same dry good feeder shown in U.S. Pat. No. 5,110,015. The new cartridge bearing assembly is constructed and arranged so that the tubular cartridge supports a removable bearing assembly which, when released from the cartridge, can be pulled through an opening in the housing without any disassembly of the dry good feeder. With this new arrangement, the total down time for replacing the bearings is approximately 15–30 minutes. As a result, the cost of maintenance is substantially reduced, and there is substantially less lost production time. A further feature and advantage of the new arrangement is that the bearing assembly is supported within the cartridge by o-rings which also act as shock absorbers, resulting in longer bearing life.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT

Figure 1:
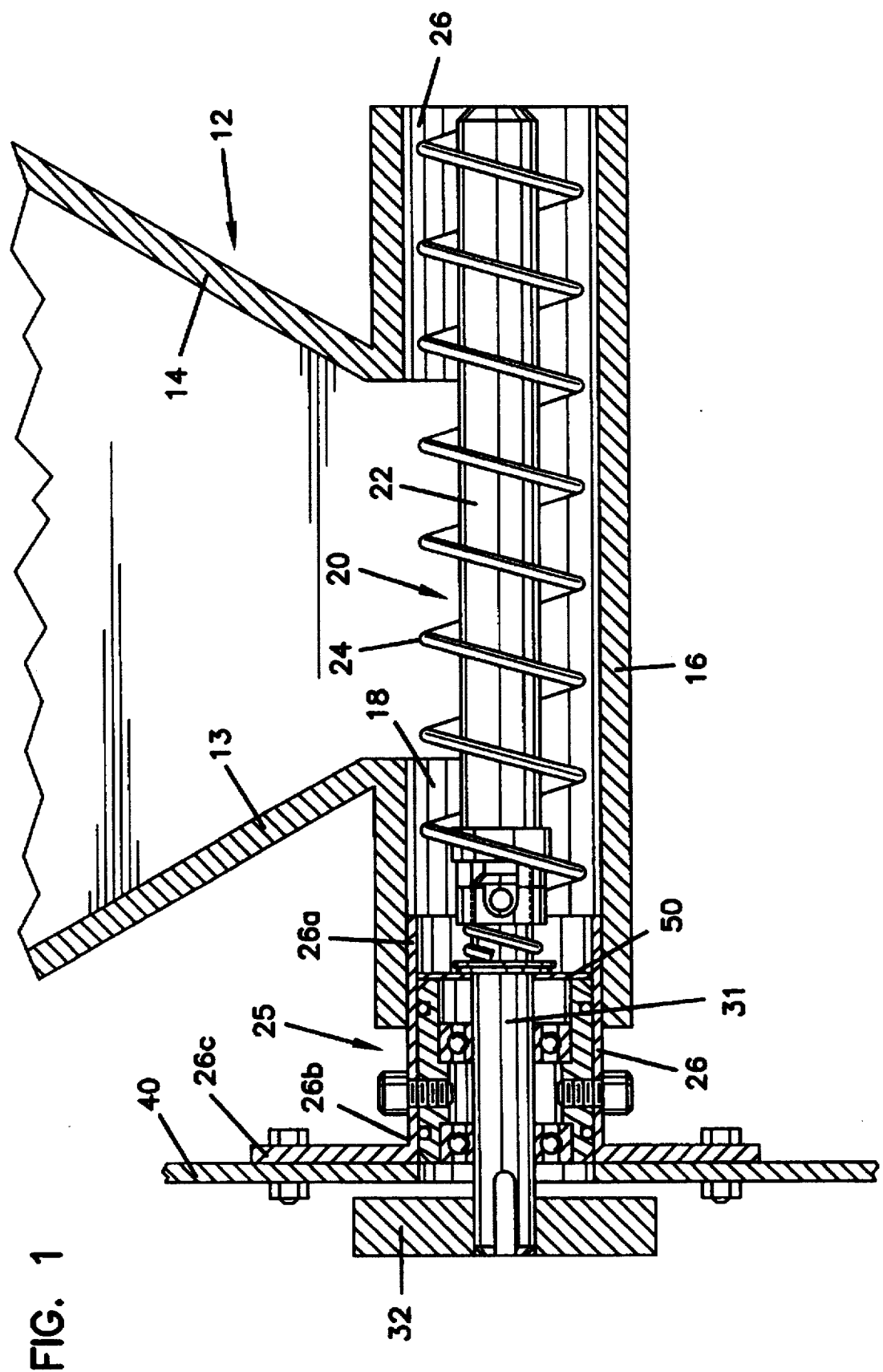
FIG. 1 is a fragmentary view of a dry good feeder having a new cartridge bearing assembly design, depicted partially in cross sections.

Referring now to the drawings, wherein like reference manuals designate corresponding structure throughout the views, and referring in particular to FIG. 1, a preferred embodiment of the invention includes a flexible hopper 12 which has an outer wall 13. Wall 13 defines a storage portion for holding dry material. Wall 13 includes a ramp portion 14 for guiding the dry material downwardly toward a feed auger 20. Hopper 12 further includes a portion 16 which has a cylindrical space 18 defined therein for housing the feed auger 20, as may be seen in FIG. 1.

Auger member 20 is partially disposed within cylindrical space 18, and extends through a cylindrical discharge space 26 which is defined on an opposite side of hopper 12 from the cylindrical space 18. Discharge space 26 is of approximately the same diameter as and is substantially aligned with cylindrical space 18. Auger member 20 includes a stub shaft 22 and a helical flight 24. Flight 24 preferably extends along the entire length of the auger member 20.

A cartridge bearing assembly 25 extends into cylindrical space 18 and is designed to supply mechanical energy to turn auger member 20. It includes a tubular bearing support member 26 having a central opening aligned with cylindrical space 18, a first end 26(a) extending into and tightly fitting within first cylindrical space 18, and a second end 26(b) attached to a wall 40 of the housing by means of a peripherally extended flange 26(c) bolted to wall 40.

Removably mounted within tubular member 26 is a bearing support assembly 27 which includes a bearing race 28 having an outer diameter sized to fit snugly within the inner diameter of tubular member 26, and a pair of spaced ball bearing assemblies 29 and 30 mounted therein for supporting a drive shaft 31. Drive sprocket 32 can be driven by another sprocket and motor as shown in U.S. Pat. No. 5,110,015, or by a chain drive arrangement, as appropriate.

Figure 2:
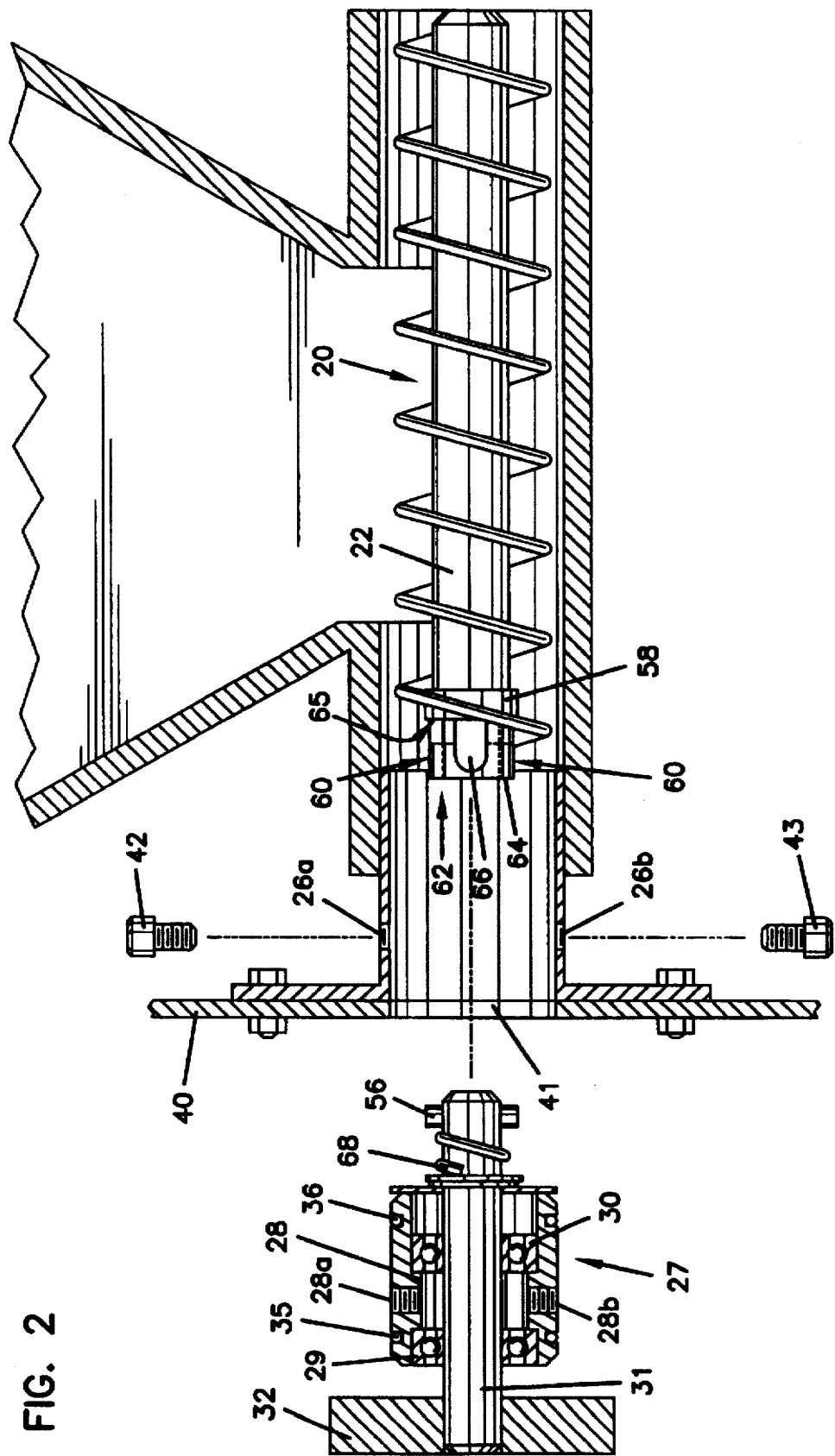
FIG. 2 is an exploded view of the dry good feeder shown in FIG. 1.

Race 28 has a cylindrical exterior having a diameter essentially the same as the inner diameter of cylindrical tubular member 26 so that it can be mounted therein as shown in FIG. 1, or removed axially therefrom as shown in FIG. 2. A circular opening 41 in wall 40 corresponds in size to the opening in tubular member 26 so that bearing support assembly 27 can be inserted or removed through that opening. Race 28 is provided with oppositely disposed threaded openings 28(a), 28(b) to accommodate set screws 42, 43 which extend through oppositely disposed openings 26(a), 26(b) in tubular member 26. In FIG. 1, set screws 42, 43 are in place to hold bearing support assembly 27 securely in place within tubular member 26.

Bearing race 28 has an axial opening constructed and arranged to support the spaced ball bearing assemblies 29 and 30 which in turn support drive shaft 31 for rotation therein. The outer surface of race 28 is provided with a pair of axially spaced annular grooves in which are mounted a pair of o-rings 35, 36. The annular grooves are slightly less deep than the diameter of the o-rings so that the o-rings extend from the grooves to engage the inner surface of tubular member 26 when bearing race 28 is inserted into tubular member 26 as shown in FIG. 1. The o-rings 35, 36 function to center bearing race 28 and also function as shock absorbers, thus reducing shocks on the bearings, resulting in longer bearing life.

After a period of use, the bearings 29, 30 may begin to fail and at that point they should be replaced. To do this, a maintenance person can disconnect the stub shaft 20 as described herein and then remove the bearing support assembly 27 axially through opening 41 by removing set screws 42, 43 using sprocket 32 as a handle, remove bearing support assembly 27 from tubular bearing support member 26, at which point sprocket 32 is to be removed from worn out bearing support assembly 27 and reinstalled into new bearing support assembly 27, the new assembly can be reinserted, locked in place with set screws 42, 43, and connected to auger member 20. This replacement can be accomplished within a relatively short time without taking apart the whole unit resulting in less maintenance costs and less down time.

Referring again to FIG. 1, a lip seal 50 is interposed within the cylindrical space 18. Seal 50 includes a lipped outer portion having a circumferential surface which bears against the inner surface of the tubular member 26. A second inner annular section of the lip seal 50 seals against the outer surface of drive shaft 31.

The flight 24 on auger member 20 extends into cylindrical space 18 to a space which is immediately proximate the lip seal 50. As a result, the pressure of the dry material in the space proximate lip seal 50 is reduced during operation of the dry good feeder, which lessens wear on the lip seal 50.

In order to isolate lip seal 50 from shock or vibration from the auger member 20 during operation, a shaft connecting linkage is also provided. Shaft connecting linkage includes a radial bore which is defined in one end of the shaft 31 for receiving a pin 56. A collar member 58 is connected to and has an enlarged cross-section relative to the stub shaft 22 of auger member 20. A pair of guide slots 60 are defined in the circumferential wall of collar member 58 for receiving the pin 56. Each of the guide slots 60 includes an opening 62 through which pin 56 may be inserted, and further includes an axially extending portion and a circumferentially extending portion 65. A locking recess 66 is also provided.

A helical compression spring 68 is provided between the lip seal 50 and an end surface 64 of the collar member 58. Spring 68 acts to keep the pin 56 seated within the locking recesses 66 during operation of the dry good feeder.

In order to change or to clean the hopper 12, auger member 20 is grasped and pushed axially toward the drive shaft 30, which causes the pin 56 to unseat from the locking recesses 66 in collar member 58. The auger member 20 is then twisted relative to drive shaft 31, whereupon the auger may be grasped and pulled in the feed direction to remove it from the flexible hopper 12. At this point, the entire hopper 12 may be grasped and pulled in the feeding direction which causes cartridge bearing assembly 25 to slip out of the cylindrical space 18 as a unit without affecting the lip seal 50 in any way. A new or clean hopper 12 and auger member 20 may then be remounted to the cartridge bearing assembly 25 by sliding the cylindrical portion 16 over the rigid tubular member 26, and by axially engaging the guide slot 60 of collar member 58 with the pin 56, and by twisting.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A dry good material feeding apparatus, comprising
   (a) a housing;
   (b) a feed hopper in said housing having an outer wall defining a storage portion for holding dry material and an auger housing portion, said auger housing portion having a first cylindrical space defined therein on a first side, and a second cylindrical space defined therein on a second side, said first and second cylindrical spaces being substantially aligned and extending through said outer wall so as to communicate said storage portion with an exterior space;
   (c) an auger member having a shaft and at least one helical flight connected thereto, said auger member being positioned so as to extend into both of said first and second cylindrical spaces;
   (d) a cartridge bearing assembly extending into said first cylindrical space for supplying mechanical energy to turn said auger member, comprising
      (i) a tubular member having a first end extending into said first cylindrical space and a second end attached to a wall of said housing;
      (ii) a bearing race assembly removably mounted in said tubular member for supporting a drive shaft releasably connected to said auger shaft; and
      (iii) an opening in said housing wall sized to permit passage of said bearing race assembly therethrough whereby said bearing race assembly can be replaced without removing said tubular member.

2. Apparatus according to claim 1 wherein said tubular member tightly fits within said first cylindrical space and has a peripherally extending flange at said second end attached to said wall.

3. Apparatus according to claim 2 wherein set screws are used to removably lock said bearing race assembly in said tubular member.

4. Apparatus according to claim 1 wherein spaced o-rings are mounted between said bearing race assembly and said tubular member.

5. A dry good material feeding apparatus, comprising:
   (a) a housing;
   (b) a feed hopper in said housing having an auger housing portion with an opening facing a wall of said housing;
   (c) a cartridge bearing assembly extending into said opening adapted to supply mechanical energy to an auger member mounted in said housing, comprising:
      (i) a bearing support member having a central opening and a first end extending into said housing portion opening, and a second end mounted to a wall of said housing;
      (ii) a bearing support assembly removably mounted in said bearing support member for rotatably supporting a drive shaft adapted to be releasably connected to an auger in said housing; and
      (iii) an opening in said housing wall aligned with said opening in said bearing support member to permit passage of said bearing support assembly therethrough to permit replacement thereof.

6. Apparatus according to claim 5 wherein said bearing support member is a member that closely fits within said housing portion opening and has a peripherally extending flange at said second end attached to said wall.

7. Apparatus according to claim 6 wherein set screws are used to removably lock said bearing support assembly in said bearing support member.

8. Apparatus according to claim 5, wherein spaced o-rings are mounted between said bearing support assembly and said bearing support member.

9. A dry good material feeding apparatus, comprising:
   (a) a housing;
   (b) a feed hopper in said housing having an auger housing portion with an opening spaced from and facing a wall of said housing;
   (c) a cartridge bearing assembly adapted to supply mechanical energy to an auger member mountable in said housing, comprising:
       (i) a bearing support member having one end extending into said opening and a second end mounted to a wall of said housing;
       (ii) a bearing support assembly removably mounted in said bearing support member for rotatably supporting a drive shaft constructed and arranged to be releasably connected to an auger in said housing; and
       (iii) an opening in said housing wall aligned with said bearing support assembly to permit passage of said bearing support assembly therethrough to permit replacement thereof.

10. Apparatus according to claim 9 wherein said bearing support member and said bearing support assembly are cylindrical members, said bearing support assembly having annular grooves therein facing said bearing support member, and o-rings in said grooves for centering and supporting said bearing support assembly in said bearing support member.

11. Apparatus according to claim 10 wherein said bearing support member has at least one opening therein aligned with a threaded opening in said bearing support assembly; and a threaded set screw for locking said members together.

* * * * *

UNITED STATES PATENT AND TRADEMARK OFFICE
CERTIFICATE OF CORRECTION

PATENT NO. : 5,715,976

DATED : FEBRUARY 10, 1998

INVENTOR(S) : KAUTZ

It is certified that error appears in the above-identified patent and that said Letters Patent is hereby corrected as shown below:

Front page, [73] Assignee: "Mich." should read --Minnesota--

Signed and Sealed this

Thirtieth Day of June, 1998

*Attest:*

BRUCE LEHMAN

*Attesting Officer*   Commissioner of Patents and Trademarks